Sept. 16, 1924.  W. C. NABORS  1,508,750
COMBINED BUMPER AND WINCH FOR MOTOR CARS
Filed Dec. 10, 1923
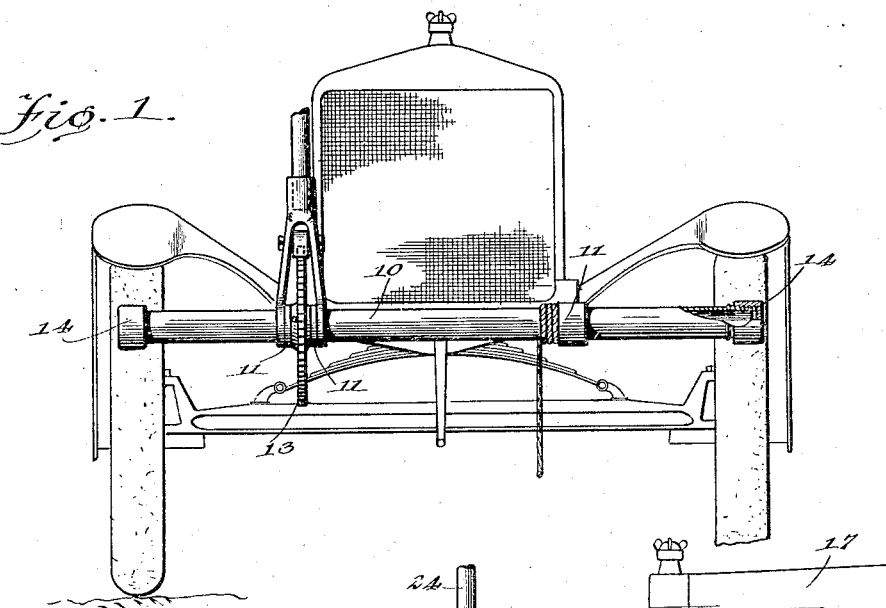
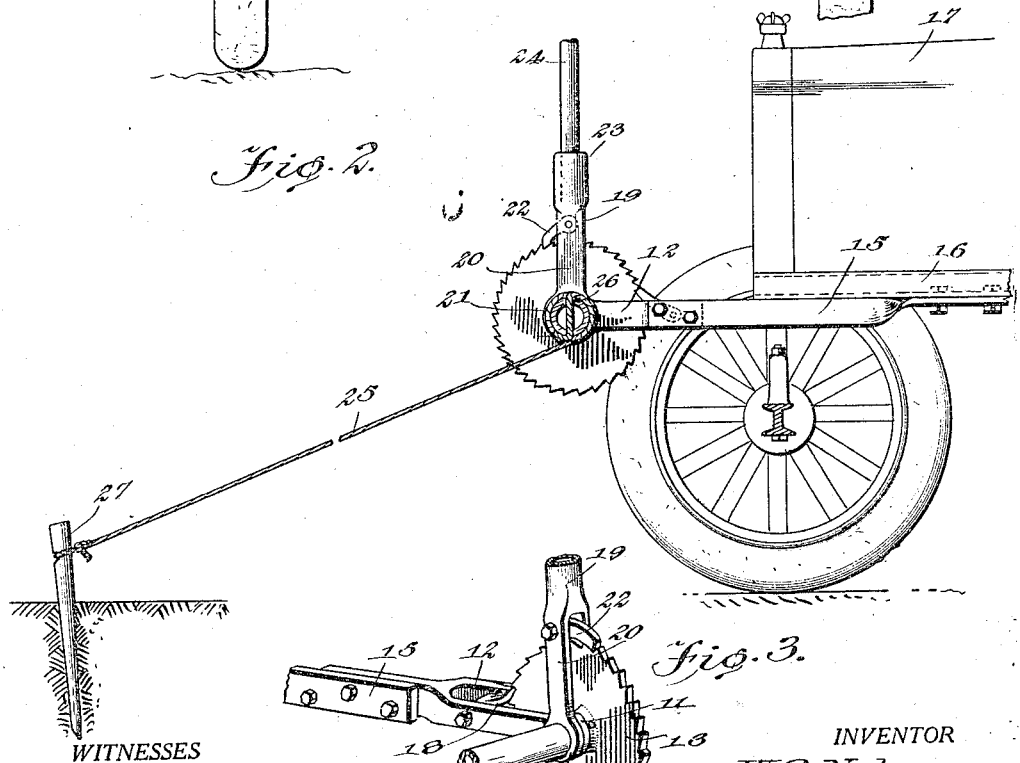
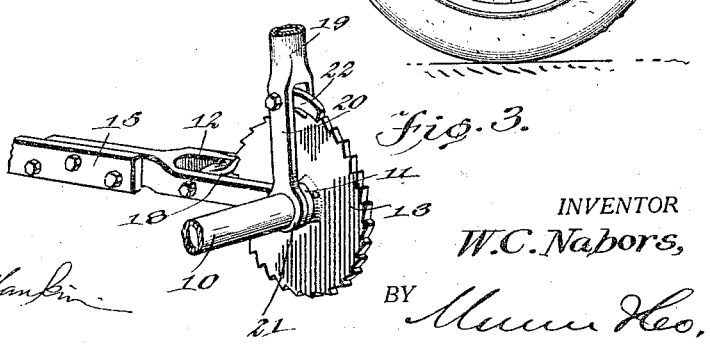
WITNESSES
INVENTOR
W. C. Nabors,
BY
ATTORNEYS Patented Sept. 16, 1924.

1,508,750

UNITED STATES PATENT OFFICE.

WILLIAM CAMPBELL NABORS, OF MANSFIELD, LOUISIANA.

COMBINED BUMPER AND WINCH FOR MOTOR CARS.

Application filed December 10, 1923. Serial No. 679,806.

*To all whom it may concern:*

Be it known that I, WILLIAM C. NABORS, a citizen of the United States, and a resident of Mansfield, in the parish of De Soto and State of Louisiana, have invented certain new and useful Improvements in Combined Bumpers and Winches for Motor Cars, of which the following is a specification.

My present invention relates generally to accessories for automobiles and motor cars and particularly to a device which will serve the double purpose of a bumper and a winch, the former useful as and for the purposes for which a bumper is usually employed, and the latter useful to pull a machine out of the mud or roadway obstructions as well as for emergency power apparatus in handling heavy work on a job which would not justify the expense of a power winch.

In the accompanying drawing illustrating my present invention and forming a part of this specification, Figure 1 is a front elevation illustrating the practical application of my invention to a motor car, Figure 2 is a sectional side view showing the apparatus in use for a certain purpose, and Figure 3 is a detail perspective view showing certain parts of the apparatus.

Referring now to these figures my invention proposes a bumper which extends as usual across the front of the vehicle in connection with which it is applied and which according to my improvements is in the form of a hollow cylindrical beam 10 which is hollow for certain purposes to be hereinafter described and which is cylindrical in order that it may rotate on its longitudinal axis within bearings 11 at the forward ends of a pair of brackets 12, one of the latter of which is forked as in Figures 1 and 3 in order to receive therein a ratchet wheel 13, the latter securely fastened to the bumper beam or bar 10.

The ends of the hollow cylindrical bumper bar or beam 10 are closed by end caps 14, one at least of which as seen at the right broken away portion of Figure 1 is threaded or otherwise detachably connected so that its removal affords ready access to the hollow within the beam or bar.

The brackets 12 are in practice securely bolted or otherwise attached to bumper supporting arms 15 and these arms are in turn bolted or otherwise suitably fastened to the side beams 16 of the frame of a motor car 17, seen in a general way in Figure 2, the forked bracket 12 seen in Figure 3 having a pivoted gravity actuated dog 18 engaging the toothed periphery of the ratchet wheel 13 at its inner portion inwardly beyond the pumper bar or beam 10 so as to coact with the ratchet lever 19, which is forked to straddle the ratchet wheel 13, with the ends of its extensions 20 journaled as at 21 on the bumper bar or beam 10, this ratchet lever 19 having therein a pawl 22 which is also gravity controlled and engageable with the teeth of the ratchet wheel 13.

The lever 19 extends but slightly beyond the periphery of the ratchet wheel 13 and its outer socket end 23 may thus be swung rearwardly and downwardly toward the vehicle in this use so as to be as nearly out of the way as is possible, it being obvious that the secure connection of the ratchet wheel 13 with the bumper beam or bar 10 avoids lengthwise displacement of the latter without the necessity of other connections for this purpose.

My invention also contemplates a handle 24 which is shiftable into the socket 23 of the lever 19 so that the latter may be actuated to bring about rotation of the bumper beam or bar 10 through the pawl 22 and ratchet wheel 13 whereby great leverage may be obtained making it possible for the driver of the motor vehicle to secure great pull upon a cable, for instance the rope or cable 25, one end of which may be attached to the bumper bar or beam 10 by virtue of an opening 26 through said bumper bar or beam or by virtue of its engagement with a pin extended for instance through said aperture 26.

The other end of the cable or rope 25 may be secured to various articles or devices depending upon the desired use of the apparatus as a winch and may for instance be connected to a stake 27 driven into the ground or to another form of anchor when for instance it is desired to employ the winch for the purpose of pulling the vehicle out of the mud or past roadway obstructions.

By removing the cap 14 at one end of the bumper bar or beam 10, the stake 27 and also the handle 24 of the ratchet lever may be inserted or withdrawn, the beam itself thus serving to house these parts when the device in so far as its function as a winch is concerned is not in use.

I claim:

A bumper for automobiles and motor cars consisting of a bumper bar or beam, supports in which the said bar or beam is mounted to rotate, and a lever journaled on the said bar or beam and having ratchet connections therewith whereby the beam may be rotated and utilized as a winch, said lever extending slightly beyond the periphery of the ratchet wheel and having a handle receiving socket, and said beam or bar being hollow and having removable end closures, and a handle for the lever adapted to be housed in the beam or bar when not in use.

WILLIAM CAMPBELL NABORS.